US000001542H

United States Statutory Invention Registration [19]

[11] Reg. Number: H1542

[45] Published: Jun. 4, 1996

Elmendorp et al.

[54] FIBER-REINFORCED COMPOSITES

[75] Inventors: Jacob J. Elmendorp; Johannes C. M. Gillemans, both of Amsterdam, Netherlands

[73] Assignee: Shell Oil Company, Houston, Tex.

[21] Appl. No.: 277,713

[22] Filed: Jul. 20, 1994

[30] Foreign Application Priority Data

Jul. 28, 1993 [EP] European Pat. Off. ..... 93202236

[51] Int. Cl.[6] ..... D03D 3/00; D03D 15/00; D03D 17/00; D03D 25/00

[52] U.S. Cl. ..... 428/224; 428/114; 428/904; 428/245; 428/252; 428/253; 428/413; 428/436; 428/441; 428/476.3; 428/476.9; 428/500; 428/515; 428/516; 428/902; 428/461; 428/523

[58] Field of Search ..... 428/114, 904, 428/245, 252, 253, 413, 436, 441, 476.3, 476.9, 500, 515, 516, 902, 461, 523

[56] References Cited

U.S. PATENT DOCUMENTS 4,443,507 4/1984 Yamada e al. .
4,871,618 10/1989 Kinneberg et al. .

FOREIGN PATENT DOCUMENTS 1301023 1/1989 European Pat. Off. .
2003789 7/1978 United Kingdom .

*Primary Examiner*—Charles T. Jordan
*Assistant Examiner*—Meena Chelliah

[57] ABSTRACT

A composite comprising two or more layers of fiber-reinforced, crosslinked epoxy resin, wherein adjacent layers of the reinforced, crosslinked epoxy resin are interspaced with a layer of a thermoplastic polymer, which thermoplastic polymer comprises a linear polymer of carbon monoxide with one or more olefinically unsaturated compounds, wherein the monomer units originating from carbon monoxide and the monomer units originating from olefinically unsaturated compounds, are present in an alternating arrangement.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIBER-REINFORCED COMPOSITES

BACKGROUND OF THE INVENTION

The present invention relates to reinforced composites, particularly to such composites comprising two or more layers of a fiber-reinforced crosslinked epoxy resin, wherein the adjacent epoxy resin layers are interspaced with a layer of a thermoplastic resin, to the preparation of said composites and to their use.

Reinforced composites or composite materials have, in addition to many excellent properties such as high specific strength, engineerability and low energy content, a number of limitations. As these fiber-reinforced composite materials are generally characterized by a high stiffness, bending of such composites will induce high shear stresses in planes parallel to the principal fiber direction. When such composites are submitted to impact testing these materials show an unacceptable degree of delamination. It is generally understood that this problem is related to the insufficient ability of these composite materials to dissipate the impact energy.

Methods which have been proposed to improve the overall performance of the fiber-reinforced composites include increasing the damage-tolerance of said composites by reducing the crosslink density of the polymer matrix or by the incorporation of an elastomeric compound. However these methods do not generally provide the desired results.

Another known modification for said reinforced composites comprises the replacement of the thermoset matrix with a thermoplastic one. Although said method improves the strain resistance of the polymer matrix, compression strength is simultaneously reduced to an unacceptably low level, due to the generally lower stiffness of the thermoplastic matrix.

Another method for improving the overall performance of the fiber-reinforced crosslinked epoxy resin composites comprises the insertion of a thermoplastic film, such as one made from Nylon 6, between the different layers of reinforced epoxy resin during the preparation of said composites. However, with this method it has been observed that the performance is hampered by insufficient adhesion between the thermoplastic interlayer and the thermoset matrix.

There remains a considerable need to improve the overall performance of fiber-reinforced, crosslinked epoxy resin composites. The problem underlying the present invention is to develop a fiber-reinforced crosslinked epoxy resin based composite, which does not suffer from one or more of the above-mentioned problems, i.e. a composite having an improved overall performance.

SUMMARY OF THE INVENTION

As a result of extensive research and experimentation it was surprisingly found possible to prepare a fiber-reinforced, crosslinked epoxy resin based composite having such an improved performance, by inserting between the adjoining layers of fiber reinforced epoxy resin a layer of a linear polymer of carbon monoxide and one or more olefinically unsaturated compounds, wherein the units from carbon monoxide and the units from the olefinic unsaturated compounds are present in a substantially alternating arrangement. The resulting fiber-reinforced composite is novel.

Accordingly, the invention provides a composite comprising two or more layers of a fiber-reinforced, crosslinked epoxy resin, wherein the adjacent layers of the reinforced epoxy resin are interspaced with a layer of a thermoplastic polymer, wherein the thermoplastic polymer comprises a linear polymer of carbon monoxide with one or more olefinically unsaturated compounds, wherein the units from carbon monoxide and the units from the olefinically unsaturated compounds are present in a substantially alternating arrangement.

DETAILED DESCRIPTION OF THE INVENTION

In the context of the present invention the term epoxy resin refers to a compound, having on average more than one α-epoxide group per molecule, and which is capable of being converted to a thermoset composite wherein a single epoxy resin may contain more than one layer of reinforcement, The epoxide group is preferably a glycidyl ether or a glycidyl ether group, the glycidyl ether groups being especially preferred. Suitable epoxy resins include diglycidyl ethers of diphenylol propane, polyglycidyl ethers of novolac resins, di-or polyglycidyl ethers of other di- or polyfunctional aromatic hydroxy compounds and di- or polyglycidyl esters of di- or polycarboxylic acids, which acids include aliphatic and aromatic di- or polycarboxylic acids. Diglycidyl ethers of diphenylol propane and polyglycidyl ethers of novolac resins are preferred epoxy resins for the composites of the present invention.

The fiber reinforcement present in the crosslinked epoxy resin layers of the composite will generally be present as a unidirectional fiber reinforcement or as a woven fabric. The nature of the actual fiber is not critical and may vary widely and includes glass, carbon, aramide, boron and aramide fibers.

The fiber content of the crosslinked epoxy resin layers will generally be in the range of from 40 to 60% by volume and preferably in the range of from 50 to 60% by volume. Unidirectional fiber reinforcements are preferred.

When unidirectional fiber reinforcement is applied, it is possible that the fiber directions in the crosslinked epoxy resin layers are the same, or that the fiber directions in the different layers are random with respect to one another. It may be advantageous to have the fiber directions in the different epoxy resin layers orientated according to a specific pattern, for example, such that the fiber direction in two adjacent layers form an angle of 45 degrees whilst the fiber directions in every first and third layer are orientated perpendicular to one another. Also when using a woven fabric as the reinforcement, it is possible to have the weave direction orientated according to a specific pattern.

Composites as described hereinbefore wherein the fiber reinforcement in some layers is a unidirectional fiber reinforcement, while in other layers a woven fabric is used, are also considered to form part of the present invention, as are those composites wherein a single epoxy resin layer may contain more than one layer of reinforcement.

The polymers of carbon monoxide with one or more olefinically unsaturated compounds, hereinafter referred to as linear alternating copolymers, may be true copolymers, i.e. copolymers of carbon monoxide and one particular olefinically unsaturated compound, e.g. ethene or propene, preferably said particular olefinically unsaturated compound is ethene. Other suitable polymers of carbon monoxide with one or more olefinically unsaturated compounds are terpolymers of carbon monoxide with two olefinically unsaturated compounds and especially with ethene and a second olefinically unsaturated compound such as propene, butene, pentene, hexene, heptene, octene, nonene, decene, dodecene, styrene, methyl acrylate, methyl methacrylate, vinyl acetate, undenoic acid, undecenol, 6-chlorohexene, N-vinylpyrolidone and the diethylester of vinyl-phosphonic acid. With said terpolymers it is preferred that ethene is present as the major olefinically unsaturated compound. More preferably the molar ratio of ethene to the second olefinically unsaturated compound is at least 3:1 and especially at least 6:1. A terpolymer of carbon monoxide with ethene and propene is the preferred terpolymer.

The linear polymers of carbon monoxide with one or more olefinically unsaturated compounds and methods for their preparation are known. An exemplary reference disclosing this subject matter is U.S. Pat. No. 3,914,391.

With the composites of the present invention it is preferred that the LVN (Limiting Viscosity Number) of the linear alternating copolymers, is in the range of from 0.7 to 1.8 dl/g.

The number of layers of reinforced crosslinked epoxy resin and of the linear alternating copolymer, as well as the approximate thickness of each type of said layer of the composite, will be largely determined by the ultimate requirements. Generally the thickness of the thermoplastic polymer layer will be in the range of from 10 to 100 microns and preferably in the range of from 20 to 50 microns, while the thickness of the reinforced crosslinked epoxy resin layers will generally be in the range of from 5 to 15 times the thickness of the thermoplastic polymer layer(s).

Although the composites of the present invention will generally be composed of substantially flat layers of reinforced, crosslinked epoxy resin interspaced with substantially flat layers of linear alternating copolymer, it is also possible for the composing layers not to be flat, but e.g. curved.

A further aspect of the present invention relates to a method for the preparation of the inventive composites. The preparation may conveniently comprise stacking layers of reinforced, crosslinkable epoxy resin system and layers of the linear alternating copolymer in an alternating arrangement, and converting the stack via compression molding at elevated temperature to a composite.

In the context of the present invention the term crosslinkable epoxy resin system refers to a system comprising all the components which are essential to provide a crosslinked epoxy resin matrix, when exposing such a system to heat. Hence such a system should include, in addition to a crosslinkable epoxy resin, at least a curing agent, while further additives and ingredients, may be present as required.

The nature of the curing agent is not critical, and may vary widely in composition provided it is of a type which in combination with a suitable epoxy resin and optionally in the presence of an accelerator, will result after reaction at elevated temperature, in a crosslinked epoxy resin matrix suitable for use as a component of the composites of the present invention.

Suitable curing agents include amino type curing agents, boron trifluoride complexes and acid curing agents. The nature of the accelerator, when used, will be determined by the type of curing agent and the curing or crosslinking conditions applied.

Suitable crosslinkable epoxy resin systems are well known from many publications and Handbooks, including for example Handbook of Epoxy Resins, H. Lee & K. Neville McGraw-Hill, New York. Moreover such epoxy resin systems are commercially available as ready for use compositions.

One of the problems related to the preparation of the composites of the present invention, is applying the crosslinkable epoxy resin system to the fiber reinforcement, and the subsequent handling of the reinforcement-containing epoxy resin system. Hence in the preparation of the composites of the present invention it is preferred to employ as the reinforcement-containing, crosslinkable epoxy resin a so-called prepreg, being a fiber reinforcement which has been impregnated with an epoxy resin system.

Said impregnation of the reinforcement is conducted in such a manner that the resulting prepreg can be stored until required for further processing, e.g. to a finished composite, without requiring the addition of further ingredients. The preparation of prepregs in general, and those based on epoxy resins in particular is known, and moreover such materials are commercially available. Details regarding the procedures which can be followed in the preparation of said prepregs, as well as the nature of the epoxy resin systems which can be employed in the preparation of said prepregs have been described for example in the brochures EK 4.9.8 (issued June 1992) and EK 4.9 (issued January 1989), which are available from Shell Chemical Company. Such prepregs possess a degree of coherence and have the appropriate degree of tack and thus afford easy handling.

In the stacking operation which precedes the molding step, the interspacing layers of linear alternating copolymer of the ultimate composite can be introduced in the form of e.g. a molten layer, a powder or a film, or can be cast from a solution; preferably the linear alternating copolymer is used in the form of a film.

During said stacking operation, when appropriate, care should be taken that the fiber direction in each of the layers of reinforced epoxy resin system corresponds with the specified pattern for the fiber direction throughout the ultimate composite. In this context it should be mentioned that one or more of the reinforced, crosslinked epoxy resin layers of the ultimate composite may be based on more than one layer of fiber reinforcement-containing crosslinkable epoxy resin system. Hence under these circumstances the stacking sequence will have to be adjusted accordingly.

The stacked layers of reinforcement containing epoxy resin system and linear alternating copolymer are suitably transferred to a mold of selected size and shape. The mold will generally be brought to a temperature which is similar to the temperature at which the resin can be cured which will typically be in the range of from 125° to 200° C. The temperature schedule of the epoxy resin system and to a lesser extent by the crystalline melting point of the linear alternating copolymer. It is preferred that the mold temperature does not exceed the crystalline melting point of the polymer.

Subsequent to closing the mold, the contents thereof may be given sufficient time to reach at least the gel stage, which time is primarily related to the thickness of the sample to be molded, and for example can be less than 1 minute for a 3 mm plate, before gradually building up the pressure in the mold to the required level. The overall molding time will be related to the nature of the epoxy resin system, but should be sufficient to provide a crosslinked epoxy resin matrix and good interlaminar adhesion at the temperature of operation. The molding technique described here is frequently referred to by the term "compression molding."

As mentioned hereinbefore it is conceivable that for certain applications it may be desirable to have composites wherein the different layers of crosslinked epoxy resin and the interspacing layers of the linear alternating copolymer are not flat but curved. One method to achieve this would be to already introduce the shaping during the stacking, e.g. by using a substrate for the stacking operation which has the desired shape, and subsequently transferring the resulting stack comprising the shaped layers, optionally together with the shaped substrate, to a suitable mold.

Alternatively it is possible to shape the composite after curing, for example, by heating it to a temperature which is above the glass transition temperature of the crosslinked epoxy resin matrix and also above the crystalline melting point of the linear alternating copolymer.

The composites of the present invention not only have superior performance properties compared to those of the corresponding composites wherein the interspacing layers of the linear alternating copolymer of carbon monoxide and one or more olefinically unsaturated compounds are absent, but also compared to those wherein the interspacing layers are based on e.g. Nylon 6.

One of the characterizing features of the composites of the present invention is their surprising ability for damping vibrations, thus making them potentially valuable outlets for those applications where this property is an important requirement, such as for certain sportsgoods, and in blades for aircraft propellers and windmills.

The invention will be further illustrated with the following non-limiting examples.

Prepreg

The prepreg was prepared on a hot-melt prepregger, using an OCF RPA/038 glass roving (2400 tex) ex Owens Corning, as the fiber reinforcement and an EPIKOTE DX-6104/EPIKURE DX-6906 blend (ex Shell Chemicals) in a 100.0/0.8 weight ratio as the epoxy resin system. The glass fiber was orientated unidirectionally. The prepreg comprised 55% by volume of glass fiber.

Details of the composition and procedures followed have been described in the brochures EK 4.9.8 (Issued June 1992) and EK 4.9 (Issued January 1989) which are available from Shell Chemical Company.

Linear Alternating Copolymer

The polymer used was a terpolymer based on carbon monoxide, ethene and propene. The polymer had a crystalline melting point of 214° C. and a limiting viscosity number of 1.1 dl/g.

The polymer was used in the form of a slit-extruded film having a thickness of 40 microns.

Thermoplastic Polymer for Comparative Experiment

In the comparative experiment a nylon-6 film having a thickness of 25 microns was used.

Test Procedures

1) The performance characteristics of the composites were assessed via a "compression after impact" procedure according to the Boeing BSS 7260-class 1 norm. Laminates of 10.2×15.2 cm (4×6 inches) were impacted using a falling weight apparatus with a 6.7 kJ/m (1500 inch-lbs/inch) impact energy. The extent of the damage resulting from the impact testing was determined with the aid of the C-scan technique. Subsequent to impacting, the samples were compression tested on a 100 tons servo-hydraulic Instron tensile tester using the prescribed support rig.

2) Interfacial bonding between the thermoplastic polymer layers and the reinforced, crosslinked epoxy resin layers was determined by utilizing the Interlaminar Shear test carried out according to ISO 4585. To accommodate for the difference in thickness of the different types of composite tested, the sample size was normalized to a length and width of 6 and 3.3 times respectively the laminate thickness. A span ratio of 5 was used respectively according to the above mentioned test method.

EXAMPLE 1

16 Layers of prepreg (22×30 cm) as previously described were stacked in a $[45/90/-45/0]_{2s}$ sequence with a 40 micron film of said linear alternating copolymer in between the consecutive layers of prepreg. The formula indicates that there is an angle of 45 degrees between the fiber direction of two consecutive layers, that the stack compresses 16 layers of prepreg, that said sequence for the fiber direction occurs twice in each half of the stack, and that the fiber direction sequence in the top and bottom half of the stack form a mirror image.

The stacked layers of prepreg and linear alternating copolymer were transferred to a mold of corresponding dimensions and having a temperature of 160° C. The mold was closed and after 20 seconds, the pressure in the mold was built-up gradually within 100 seconds to a pressure which corresponded with a force of 300 KN on the mold. This pressure was maintained for 7 minutes while simultaneously keeping the mold temperature at 160° C. before opening the mold opening and allowing the composite to cool to ambient temperature.

The composite preparation was repeated a number of times in order to have sufficient material available for testing.

The results of the tests to which the composites were submitted are shown in Tables 1 and 2.

Comparative Experiment 1

The procedure as described in Example 1 was repeated but omitting the insertion of the film based on the linear alternating copolymer between the layers of prepreg.

The thus prepared composites were also tested, the data having been included in Tables 1 and 2.

Comparative Experiment 2

The procedure as described in Example 1 was repeated but replacing the film based on the linear alternating copolymer with a Nylon-6 film of 25 micron thickness. The relevant test results have also been included in Tables 1 and 2.

TABLE 1

| | | Impact | | Compression | |
|---|---|---|---|---|---|
| Composite | Thickness mm | energy J (inch-lbs) | damage $cm^2$ | strength MPa | max load Kn |
| Example I Specimen | | | | | |
| 1* | 5.02 | 33.4 (296) | 4.0 | 219 | 112 |
| 1a* | 5.00 | 33.3 (295) | 4.0 | 241 | 123 |
| 2 | 4.84 | 32.3 (286) | 3.1 | 235 | 116 |
| 2a | 4.83 | 32.2 (285) | 2.5 | 240 | 118 |

TABLE 1-continued

| Composite | Thickness mm | Impact energy J (inch-lbs) | Impact damage $cm^2$ | Compression strength MPa | Compression max load Kn |
|---|---|---|---|---|---|
| 3 | 4.94 | 33.0 (292) | 3.3 | 246 | 124 |
| 3a | 4.96 | 33.1 (293) | 3.3 | 246 | 124 |
| Comp. exp 1 Specimen | | | | | |
| 1 | 4.31 | 28.8 (255) | 6.1 | 223 | 98 |
| 1a | 4.31 | 28.8 (255) | 6.1 | 192 | 84 |
| 2 | 4.31 | 28.8 (255) | 5.9 | 196 | 86 |
| 2a | 4.31 | 0 (0) | — | 252 | 110 |
| 3 | 4.31 | 28.8 (255) | 6.1 | 217 | 95 |
| 3a | 4.30 | 28.7 (254) | 5.6 | 221 | 97 |
| 4 | 4.34 | 28.9 (256) | 6.6 | 215 | 95 |
| 4a | 4.34 | 28.9 (256) | 6.4 | 214 | 95 |
| Comp. exp 2 Specimen | | | | | |
| 1 | 4.55 | 30.4 (269) | 22 | 150 | 69 |
| 1a | 4.55 | 30.4 (269) | 20 | 158 | 73 |
| 2 | 4.56 | 30.4 (269) | 21 | 137 | 64 |
| 2a | 4.56 | 30.4 (269) | 18 | 136 | 64 |

*indicates that both specimens originate from the same composite sample.

TABLE 2

| Composite | ILSS* 0° | (MPa) 90° |
|---|---|---|
| Example 1 | 44 | 45 |
| Comp. ex. 1 | 45 | 45 |
| Comp. ex. 2 | 32 | 38 |

*Interlaminar shear strength

From the data presented in Tables 1 and 2 it can be concluded that the composites wherein the reinforced, crosslinked epoxy resin layers are interspaced with a layer of a linear alternating copolymer do indeed have superior performance properties when compared with the non-interspaced composites and those composites wherein the interspacing layer of thermoplastic polymer is based on Nylon-6. The improved interlaminar shear strength measures for the composites which contain layers of the linear alternating copolymer supports that the increased damage-tolerance of these composites is the result of an improved adhesion between the crosslinked epoxy resin and the linear alternating copolymer, as compared with the composite which comprises Nylon-6.

This invention has been described in detail for the purpose of illustration, it is not be construed as limited thereby but is intended to cover all changes and modifications within the spirit and scope thereof.

What is claimed is:

1. A composite comprising two or more layers of fiber-reinforced, crosslinked epoxy resin, wherein adjacent layers of the reinforced, crosslinked epoxy resin are interspaced with a layer of a thermoplastic polymer, wherein said thermoplastic polymer comprises a linear alternating polymer of carbon monoxide and one or more olefinically unsaturated compounds.

2. A composite as claimed in claim 1, wherein said linear polymer is a copolymer of carbon monoxide and ethene.

3. A composite as claimed in claim 1 wherein said linear polymer is a terpolymer of carbon monoxide with two olefinically unsaturated compounds, ethene and propene, which are present in a molar ratio of at least 3:1.

4. A composite as in claim 1 wherein said linear polymer has a limiting viscosity number (LVN) in the range of from 0.7 to 1.8 dl/g.

5. A composite as in claim 1 wherein said epoxy groups of the epoxy resin is glycidyl ether.

6. A composite as in claim 1 wherein said epoxy groups of the epoxy resin is glycidyl ether group.

7. A composite as in claim 1 wherein said epoxy resins are diglycidyl ethers of diphenylol propane or polyglycidyl ethers of novolac resins.

8. A composite as in claim 1 wherein said epoxy resins are polyglycidyl ethers of novolac resins.

9. A composite as in claim 1 wherein in each of the crosslinked epoxy resin layers the fiber reinforcement is present as a unidirectional fiber reinforcement or as a woven fabric and wherein the fiber content of the crosslinked epoxy resin layers being in the range of from 40 to 60% by volume.

10. A composite as in claim 1 wherein in each of the crosslinked epoxy resin layers the fiber reinforcement is present as a woven fabric and wherein the fiber content of the crosslinked epoxy resin layers being in the range of from 40 to 60% by volume.

11. A composite as claimed in claim 1 wherein the thickness of the interspacing layer(s) of the linear polymer is in the range of from 10 to 100 microns and the thicknesses of the reinforced crosslinked epoxy resin layers are in the range of from 5 to 15 times the thickness of the linear polymer layer(s).

* * * * *